3,172,860
AQUEOUS HIGH-VISCOSITY AMMONIUM
HYDROXIDE COMPOSITION
John F. Sufer, Charleston, W. Va., assignor to Union
Carbide Corporation, a corporation of New York
No Drawing. Filed Aug. 12, 1960, Ser. No. 49,142
5 Claims. (Cl. 252—152)

This invention relates to high-viscosity ammonium hydroxide compositions, and to a method for their preparation.

Strong reagents such as ammonium hydroxide have a multitude of uses such as, for example, cleaning agents in the preparation of surfaces prior to the application of protective coatings and in alkali cleaning of surfaces in general. However, the fluidity of these reagents very often limits their utility. Increasing the viscosity of these reagents, even to the point of gelation, would be desirable providing that the reagent remained reactive and the high-viscosity state persisted for practical lengths of time. Attempts to produce such high-viscosity reagents with conventional thickening agents such as gelatin, casein, gum arabic, and the like, have been unsuccessful. Either the reagent will not gel in the first place, or if it does so, it is so short-lived as to have no practical value.

Accordingly, it is a main object of the present invention to prepare high-viscosity ammonium hydroxide compositions.

It has been discovered that high-viscosity ammonium hydroxide solutions can be prepared by incorporating therein a thickening quantity of poly(alkylene oxide) having a molecular weight in the range between about twenty thousand and ten million.

The poly(alkylene oxide) materials contemplated to be employed in the practice of this invention are those having a molecular weight in the range between about twenty thousand and ten million, and preferably in the range between two hundred thousand and nine million. The preferred poly(alkylene oxides) are those prepared by the polymerization of 1,2-alkylene oxide monomers containing between two and about four carbon atoms. Poly(ethylene oxide) resins having a molecular weight in the range between about two hundred thousand and nine million are eminently preferred as thickening agents. In the absence of suitable molecular weight determination, the poly(alkylene oxide) resins are characterized as having a reduced viscosity in excess of 0.3 and not greater than 100 in the best solvent available for a particular poly(ethylene oxide). Molecular weight may be determined by standard methods such as ultracentrifuge, light dissymmetry or osmotic pressure. Reduced viscosity may be determined with the Ubbelohde, the Ostwald or equivalent viscometer in the temperature range between 20° C. and 30° C., using a resin concentration in solution sufficiently low to produce an approximate linear relationship between reduced viscosity and polymer concentration between infinite dilution and the concentration at which the reduced viscosity is determined. Reduced viscosity is defined by the expression:

$$I_r = \frac{T - T_o}{(T_o)(C)}$$

wherein T is the time required for a low concentrate polymer solution to pass through a standardized Ubbelohde viscometer; wherein $T_o$ is the time for the pure solvent to pass through the viscometer; and wherein C is the concentration of the solution.

The high-viscosity compositions of this invention retain their alkaline reactivity and high-viscosity state for periods of time sufficient for practical utility. The compositions can be successfully employed in applications where the fluidity of ammonium hydroxide reagent is a disadvantage and hinders the practical use of this reagent on non-horizontal surfaces and the like. The ammonium hydroxide gels of this invention can be applied to vertical surfaces and overhead surfaces without any flow and loss of material. This permits excellent results with an economy of reagent material, and prevents contact of the reagent with surrounding surfaces. The high viscosity of the reagents also facilitates their handling in other applications.

The ammonium hydroxide solutions which are converted into high-viscosity reagents can have a concentration in the range between about 5 and 25 percent, and preferably a concentration in the range between about 5 and 10 percent.

The quantity of poly(alkylene oxide) component employed varies over a broad range depending on many factors such as the concentration of the ammonium hydroxide solution, the molecular weight of the poly(alkylene oxide), and the particular composition viscosity desired. It has been found that even a minute quantity of poly(alkylene oxide) has a measurable thickening effect when added to the ammonium hydroxide solutions. Generally, the poly(alkylene oxide) resin is employed in a quantity between about 1 and 25 percent and higher, and preferably in a quantity between 1 and 20 percent. It is convenient to prepare the compositions by introducing the poly(alkylene oxide) resin in a quantity sufficient to provide a viscosity in the range between about five thousand and two million centipoises at 25° C. as measured by a standard viscometer such as a Brookfield Model RVF viscometer. When employing ammonium hydroxide solutions having a concentration between about 5 and 20 percent, gel formation generally can be obtained when the poly(alkylene oxide) thickening agent is employed in a quantity between about 1 and 20 percent.

A representative ammonium hydroxide gel composition is prepared by employing ammonium hydroxide having a concentration of 5 to 20 percent, and between about 1 and 20 weight percent, based on the weight of ammonium hydroxide, of poly(ethylene oxide) having a molecular weight in the range between about two hundred thousand and nine million.

It has been found advantageous to include in the compositions sequestering agents and/or anti-oxidants in a quantity sufficient to prevent degradation of the poly(alkylene oxide) component, particularly when there is present catalytic quantities of metals such as iron. Illustrative of useful sequestering agents are ethylene diamine tetraacetic acid and its various sodium salts, and the like. Illustrative of useful anti-oxidants are 1-acetyl-2-thiourea, N,N,N',N' - tetrakis(2 - hydroxypropyl)ethylenediamine, and the like. These additives generally are effective when employed in an amount between about 0.5 and 2 weight percent, based on the weight of poly(alkylene oxide).

The following example will serve to illustrate a specific embodiment of the invention.

*Example*

Several compositions of this invention were prepared by employing different molecular weight poly(ethylene oxide) resins and 15 percent by weight ammonium hydroxide. Solutions of ethylene diamine tetraacetic acid and 1-acetyl-2-thiourea were mixed into the ammonium hydroxide solution to give 1 percent by weight of each based on the amount of poly(ethylene oxide) employed. All the components were mixed together and stirred vigorously. The solutions were placed in sealed glass jars and stored in a constant temperature room at 23° C. The composition viscosity was checked with a Brookfield viscometer. Although some decrease in viscosity with time was noted, the viscosity was sufficiently high that there was little or no flow of the composition unless force was applied.

| Poly(ethylene oxide) Resin [1] | Percent Solids | Initial Visc., Cps. | Visc. 5 Days, Cps. | Visc. 18 Days, Cps. |
|---|---|---|---|---|
| A | 10 | 16,300 | 12,400 | 9,500 |
| A | 18 | 234,000 | 206,000 | 185,000 |
| B | 10 | 101,000 | 80,000 | 79,000 |
| B | 20 | 1,240,000 | 1,140,000 | 1,140,000 |
| C | 5 | 298,000 | 348,000 | 369,000 |
| C | 10 | >2,000,000 | >2,000,000 | >2,000,000 |
| D | 5 | 552,000 | 650,000 | 688,000 |
| D | 10 | >2,000,000 | >2,000,000 | >2,000,000 |

[1] Resin A—M.W. in the range between 200,000 and 400,000. Resin B—M.W. in the range between 500,000 and 800,000. Resin C—M.W. in the range between 3,000,000 and 4,000,000. Resin D—M.W. in the range between 7,000,000 and 9,000,000.

Similar results are observed when water soluble copolymers of ethylene oxide such as poly(ethylene oxide-propylene oxide) and the like are employed as thickening agents in the same manner as demonstrated above with poly(ethylene oxide).

What is claimed is:

1. An aqueous high viscosity composition consisting essentially of from about 5 to about 25 percent by weight ammonium hydroxide, a thickening amount of a water-soluble polymer of ethylene oxide having a molecular weight in the range between about twenty thousand and ten million, and the remainder of said composition being water, wherein said composition has a viscosity between about five thousand and two million centipoises at 25° C.

2. An aqueous high viscosity composition consisting essentially of from about 5 to about 25 percent by weight of ammonium hydroxide, between 1 and 25 percent by weight of a water-soluble polymer of ethylene oxide having a molecular weight in the range between about twenty thousand and ten million, and the remainder of said composition being water, said composition having a viscosity between about five thousand and two million centipoises at 25° C.

3. The aqueous high viscosity composition of claim 2 wherein the composition contains additionally a sufficient quantity of 1-acetyl-2-thiourea as an anti-oxidant to prevent degradation of said polymer of ethylene oxide.

4. The aqueous high viscosity composition of claim 2 wherein the composition contains additionally a sufficient quantity of N,N,N′,N′-tetrakis(2 - hydroxypropyl)ethylene diamine as an anti-oxidant to prevent degradation of said polymer of ethylene oxide.

5. The aqueous high viscosity composition of claim 2 wherein the polymer of ethylene oxide is poly(ethylene oxide) having a molecular weight in the range between about two hundred thousand and nine million.

References Cited by the Examiner

UNITED STATES PATENTS

| | | |
|---|---|---|
| 1,812,074 | Atack | June 30, 1931 |
| 3,001,949 | Hansen | Sept. 26, 1961 |

FOREIGN PATENTS

| | | |
|---|---|---|
| 505,030 | Canada | Aug. 10, 1954 |

OTHER REFERENCES

Harris: "Shampoo Formulation," in The American Perfumer and Essential Oil Review, November 1946, pp. 54 and 56.

Hill et al.: "Polyox," Ind. and Eng. Chem., vol. 50, No. 1, January 1958, pp. 5–16.